United States Patent
Ehrne et al.

(10) Patent No.: US 10,234,059 B2
(45) Date of Patent: Mar. 19, 2019

(54) VACUUM VALVE

(71) Applicant: VAT Holding AG, Haag (CH)

(72) Inventors: Florian Ehrne, Frumsen (CH); Daniel Seitz, Au (CH); Andreas Hofer, Widnau (CH)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 15/682,673

(22) Filed: Aug. 22, 2017

(65) Prior Publication Data
US 2018/0051825 A1    Feb. 22, 2018

(30) Foreign Application Priority Data

Aug. 22, 2016  (AT) .................................. A 384/2016

(51) Int. Cl.
| | |
|---|---|
| *F16K 51/02* | (2006.01) |
| *F16K 3/18* | (2006.01) |
| *F16K 31/12* | (2006.01) |
| *F16K 31/122* | (2006.01) |
| *F16K 31/02* | (2006.01) |

(52) U.S. Cl.
CPC ................ *F16K 51/02* (2013.01); *F16K 3/18* (2013.01); *F16K 3/188* (2013.01); *F16K 31/1225* (2013.01); *F16K 3/184* (2013.01); *F16K 31/02* (2013.01); *F16K 31/122* (2013.01)

(58) Field of Classification Search
CPC .......... F16K 3/029; F16K 3/0254; F16K 3/16; F16K 3/18; F16K 3/182; F16K 3/184; F16K 3/186; F16K 3/188; F16K 31/1225; F16K 31/122; F16K 51/00; F16K 51/02
See application file for complete search history.

(56) References Cited

U.S. PATENT DOCUMENTS

| | | | |
|---|---|---|---|
| 5,641,149 | A | 6/1997 | Ito |
| 5,934,646 | A | 10/1999 | Tamura et al. |

(Continued)

FOREIGN PATENT DOCUMENTS

| | | |
|---|---|---|
| DE | 102012021354 | 5/2013 |
| DE | 102014109673 | 1/2015 |

(Continued)

*Primary Examiner* — Reinaldo Sanchez-Medina
*Assistant Examiner* — Hailey K Do
(74) *Attorney, Agent, or Firm* — Volpe and Koenig, P.C.

(57) ABSTRACT

A vacuum valve including a valve body with first and second valve openings, first and second closure elements attached to a valve rod, a longitudinally adjustable transmission piece attached to the valve rod that is adjustable from an open position into an intermediate position, and in a transverse adjustment direction from the intermediate position into a first closing position, and counter thereto into a second closing position. The transmission piece is connected to the valve body via a longitudinal stroke linear guide and a transverse stroke linear guide having a transverse stroke guide part which extends parallel to an oblique adjustment direction and a transverse stroke carriage displaceably guided thereon. To adjust the transmission piece from the intermediate position into the first or second closing position, the transverse stroke carriage is linearly displaceable in or counter to the oblique adjustment direction from a central position into a first or second press-on position.

12 Claims, 10 Drawing Sheets

(56) References Cited

U.S. PATENT DOCUMENTS

| | | | |
|---|---|---|---|
| 6,045,117 A | 4/2000 | Tamura et al. | |
| 6,056,266 A | 5/2000 | Blecha | |
| 6,082,706 A | 7/2000 | Iric | |
| 6,095,741 A | 8/2000 | Kroeker et al. | |
| 6,237,892 B1 | 5/2001 | Ito | |
| 6,390,448 B1 | 5/2002 | Kroeker et al. | |
| 6,619,618 B2 | 9/2003 | Ishigaki et al. | |
| 6,899,316 B2 | 5/2005 | Duelli | |
| 6,913,243 B1 | 7/2005 | Tomasch | |
| 7,066,443 B2 | 6/2006 | Ishigaki | |
| 7,500,649 B2 | 3/2009 | Litscher et al. | |
| 7,611,122 B2 | 11/2009 | Tichy | |
| 7,762,527 B2 | 7/2010 | Schoen et al. | |
| 7,980,529 B2 | 7/2011 | Seitz | |
| 8,177,190 B2 | 5/2012 | Maerk | |
| 8,505,875 B2 | 8/2013 | Mahr et al. | |
| 8,672,293 B2 | 3/2014 | Ehme et al. | |
| 8,800,956 B2 | 8/2014 | Ishigaki et al. | |
| 8,960,641 B2 | 2/2015 | Blecha | |
| 2005/0092953 A1* | 5/2005 | Hayashi | F16K 3/16 251/167 |
| 2007/0272888 A1 | 11/2007 | Tichy | |
| 2008/0017823 A1 | 1/2008 | Litscher | |
| 2009/0272324 A1* | 11/2009 | Balasubramanyam | C23C 16/4401 118/733 |
| 2010/0219362 A1 | 9/2010 | Duelli | |
| 2011/0095218 A1 | 4/2011 | Schoch et al. | |
| 2012/0258242 A1 | 10/2012 | Tsunoda et al. | |
| 2012/0298899 A1 | 11/2012 | Geiser et al. | |
| 2013/0112906 A1 | 5/2013 | Ishigaki et al. | |
| 2014/0131603 A1 | 5/2014 | Blecha | |
| 2014/0183391 A1 | 7/2014 | Blecha | |
| 2015/0014556 A1 | 1/2015 | Ishigaki et al. | |
| 2016/0305555 A1 | 10/2016 | Jee | |
| 2017/0204647 A1 | 7/2017 | Ehrne | |
| 2018/0274695 A1 | 9/2018 | Ehrne | |

FOREIGN PATENT DOCUMENTS

| | | |
|---|---|---|
| EP | 1061301 | 7/2004 |
| EP | 2605271 | 6/2013 |
| EP | 2749798 | 7/2014 |
| JP | 9303578 | 11/1997 |
| JP | H112360 | 1/1999 |
| JP | H11351419 | 12/1999 |
| JP | 2000257751 | 9/2000 |
| JP | 2009191924 | 8/2009 |
| JP | 2013087814 | 5/2013 |
| KR | 20090112134 | 10/2009 |
| KR | 1020110118342 | 10/2011 |
| KR | 1020130113624 | 10/2013 |
| WO | 2009070824 | 6/2009 |
| WO | 2010034046 | 4/2010 |
| WO | 2011132997 | 10/2011 |
| WO | 2014075757 | 5/2014 |
| WO | 2016142150 | 9/2016 |
| WO | 2017022968 | 2/2017 |

* cited by examiner

VACUUM VALVE

INCORPORATION BY REFERENCE

The following documents are incorporated herein by reference as if fully set forth: Austrian Patent Application No. A 384/2016, filed Aug. 22, 2016

BACKGROUND

The invention relates to a vacuum valve, comprising a valve body with a first valve opening which has a first axis and is surrounded by a first valve seat, and with a second valve opening which has a second axis and is surrounded by a second valve seat, a first and a second closure element which are attached to a valve rod, a transmission piece which is attached to the valve rod and which is adjustable in a longitudinal adjustment direction from an open position, in which the first and the second closure element open up the first and second valve opening, into an intermediate position, in which the first and the second closure element overlap the first and second valve opening, but are raised from the first and second valve seat, and which is adjustable in a transverse adjustment direction from the intermediate position into a first closing position, in which the first closure element lies against the first valve seat, and counter to the transverse adjustment direction from the intermediate position into a second closing position, in which the second closure element lies against the second valve seat, a longitudinal stroke drive by which the transmission piece is adjustable from the open position into the intermediate position, a longitudinal stroke linear guide which has a longitudinal stroke guide part extending parallel to the longitudinal adjustment direction and a longitudinal stroke carriage which is guided displaceably by the longitudinal stroke guide part, where, for the adjustment of the transmission piece from the open position into the intermediate position, the longitudinal stroke carriage is displaceable linearly in relation to the longitudinal stroke guide part, or the longitudinal stroke guide part is displaceable linearly in relation to the longitudinal stroke carriage, in the longitudinal adjustment direction by the longitudinal stroke drive, and a transverse stroke drive by which the transmission piece is adjustable from the intermediate position into the first closing position or into the second closing position.

Vacuum valves in which, in order to close the vacuum valve, the closure element is first of all displaced in a longitudinal adjustment direction, which lies parallel to the longitudinal axis of the valve rod, from a first position, in which the closure element opens up the valve opening, into a second position, in which the closure element overlaps the valve opening, but is still raised from the valve seat, and, as a result, is adjusted in a transverse adjustment direction lying at an angle to the longitudinal adjustment direction into a third position, in which the closure element is placed against the valve seat, are also referred to as L valves.

In the case of a non-generic design of L valves, the valve rod is mounted pivotably about an axis lying at right angles to the longitudinal adjustment direction, in order to permit the adjustment of the closure element from its second position into its third position and back. In order to pivot the valve rod about the axis, use can be made here of slotted guide mechanisms, as known, for example, from U.S. Pat. No. 6,237,892 B1, U.S. Pat. No. 7,066,443 B2 or US 2012/0258242 A1.

In the case of L valves in which, in order to adjust the closure element between the second position and the third position, a parallel displacement of the closure element in a transverse adjustment direction lying at an angle, in particular at right angles, to the longitudinal adjustment direction takes place, according to a customary embodiment drive elements for adjusting the closure element between the second position and the third position are arranged on a supporting unit bearing the closure element, wherein the supporting unit is located within the valve housing of the vacuum valve and is attached to a valve rod led out of the vacuum region of the vacuum valve. Such embodiments of L valves are found, for example, in U.S. Pat. No. 6,056,266 A, U.S. Pat. No. 6,899,316 B2 and U.S. Pat. No. 7,611,122 B2. In this connection, U.S. Pat. No. 6,056,266 A and U.S. Pat. No. 7,611,122 B2 also reveal sequence controls in order to ensure the correct sequence of actuation of the piston-cylinder units. A further such sequence control for an L valve is found in U.S. Pat. No. 8,177,190 B2.

L valves in which a linear displacement of the closure element between the second position and the third position takes place, wherein both the drive for the adjustment of the closure element between the first and the second position and the drive for the adjustment of the closure element between the second and third position are arranged outside the vacuum, are found in WO 2010/034046 A1 and U.S. Pat. No. 7,762,527 B2.

Also in the case of the vacuum valve known from US 2013/0112906 A1, a linear displacement of the closure element between the second position and the third position takes place. The longitudinal stroke and the transverse stroke take place here by the use of a common drive arranged outside the vacuum region of the vacuum valve. The movement guidance of the closure element is brought about by slotted guide mechanisms which have control cams which engage in cam recesses.

A vacuum valve of the type mentioned at the beginning is found in U.S. Pat. No. 8,960,641 B1. The valve rod is guided displaceably in a longitudinal adjustment direction, wherein portions of a transmission piece which is attached to the valve rod form first and second longitudinal stroke carriages which are guided displaceably along rod-shaped guide parts. The longitudinal stroke carriages and the rod-shaped guide parts together form first and second longitudinal stroke linear guides. The rod-shaped guide parts are displaceable parallel to a transverse adjustment direction lying at right angles to the longitudinal adjustment direction and can be displaced in and counter to the transverse adjustment direction by a transverse stroke drive formed by pneumatic piston-cylinder units. In order to displace the valve rod in the longitudinal adjustment direction, use is likewise made of pneumatic piston-cylinder units, the valve rods of which are connected to the transmission piece, wherein this connection permits movability of the transmission piece in relation to the valve rods in the transverse adjustment direction. First and second closure elements are attached to the valve rod and can be used to alternatively close first and second valve openings by displacement of the transmission piece in and counter to the transverse adjustment direction. A disadvantage of the device found in this document is the relatively complicated design of the unit having the drive and guide elements, which leads to the vacuum valve being more expensive.

Further vacuum valves which have a valve housing with first and second valve openings which are alternatively closeable by first and second closure members are known from U.S. Pat. No. 6,390,448 B1, U.S. Pat. No. 6,913,243 B1 and US 2011/0095218 A1. Starting from the position in which the first and second closure elements are arranged centrally between the valve openings, closure either of the first valve opening by means of the first valve plate or of the second valve opening by the second valve plate takes place here by pivoting of the valve rod about a pivot axis lying at right angles to the valve rod, with a linear displacement of the valve rod also being mentioned in US 2011/0095218 A1.

US 2015/0014556 A1 reveals a further vacuum valve which has first and second closure elements for the alternative closing of first and second valve openings. The longitudinal stroke and the transverse stroke take place here by a common drive. Starting from the open state of the vacuum valve, this drive adjusts a yoke in the longitudinal adjustment direction, wherein the yoke is guided displaceably in the longitudinal adjustment direction via guide cams which engage in cam recesses. The yoke interacts via a spring with a transmission piece attached to the valve rod. At the end of an adjustment travel of the transmission piece in the longitudinal adjustment direction, said transmission piece runs up against a stop and the yoke is moved further in the longitudinal adjustment direction. Guide cams which engage in cam recesses, which have a curved profile, on the yoke are arranged on the transmission piece. As a result, during the further adjustment of the yoke in the longitudinal adjustment direction, the transmission piece is first of all moved in a transverse adjustment direction until the first closure element closes the first valve opening, and, during the further movement of the yoke in the longitudinal adjustment direction, is moved counter to the transverse adjustment direction until the second closure element closes the second valve opening. Depending on at which point the adjustment of the yoke in the longitudinal adjustment direction is ended, either the first or the second valve opening can therefore be closed. However, it would be desirable for a closure of the second valve opening also to be possible without previously moving the first closure element against the first valve seat.

SUMMARY

It is the object of the invention to provide an advantageous vacuum valve of the type mentioned at the beginning, which has an expedient movement sequence. This is achieved according by a vacuum valve with one or more features of the invention.

The vacuum valve according to the invention has, in addition to the at least one longitudinal stroke linear guide, at least one transverse stroke linear guide. The latter has a transverse stroke guide part which is arranged parallel to an oblique adjustment direction. The oblique adjustment direction lies obliquely with respect to the longitudinal adjustment direction, i.e. encloses an angle which is greater than 0° and smaller than 90°, preferably greater than 4° and smaller than 45°, therewith, wherein a value of between 5° and 20° is particularly preferred. The transverse stroke guide part is designed in particular as a guide rail, but could also be formed, for example, by a rod. A transverse stroke carriage is guided displaceably parallel to the oblique adjustment direction by the transverse stroke guide part.

The transmission piece which is fixed to the valve rod is connected via the at least one longitudinal stroke linear guide and the at least one transverse stroke linear guide to the valve body. For the closing of the vacuum valve from the open state thereof, the transmission piece is adjusted in the longitudinal adjustment direction from an open position into an intermediate position by the longitudinal stroke drive. The valve rod and the first and second closure elements attached thereto are likewise displaced here in the longitudinal adjustment direction (=parallel displacement). In order, starting from the intermediate position of the transmission piece, to close the first valve opening by the first closure element, the transmission piece is adjusted from the intermediate position into the first closing position by the transverse stroke drive by an adjustment between the transverse stroke carriage and the transverse stroke guide part taking place in the oblique adjustment direction. Depending on the exemplary embodiment, in this connection the transverse stroke carriage can be displaced linearly in relation to the transverse stroke guide part, or the transverse stroke guide part can be displaced linearly in relation to the transverse stroke carriage. In the intermediate position of the transmission piece, the transverse stroke carriage takes up a central position in relation to the transverse stroke guide part, and, in the first closing position of the transmission piece, the transverse stroke carriage takes up a first press-on position in relation to the transverse stroke guide part. By contrast, in order to adjust the transmission piece from the intermediate position into the second closing position, a linear displacement of the transverse stroke carriage in relation to the transverse stroke guide part, or of the transverse stroke guide part in relation to the transverse stroke carriage, takes place counter to the oblique adjustment direction by the transverse stroke drive from the central position, which the transverse stroke carriage takes up in relation to the transverse stroke guide part, into a second press-on position which the transverse stroke carriage takes up in relation to the transverse stroke guide part. The central position of the transverse stroke carriage in relation to the transverse stroke guide part lies between the first press-on position and the second press-on position.

By use of the adjustment of the transverse stroke carriage in relation to the transverse stroke guide part, or of the transverse stroke guide part in relation to the transverse stroke carriage, from the central position into the first or second press-on position, a linear displacement of the transmission piece, and therefore also of the valve rod and the first and second closure elements attached thereto, therefore occurs in or counter to the transverse adjustment direction. If the transmission piece is adjusted from the intermediate position into the first or second closing position, a relative displacement also occurs here between the longitudinal stroke guide part and the longitudinal stroke carriage. However, the position of the transmission piece in relation to the valve housing with reference to the longitudinal adjustment direction does not change as a result.

By the use of linear guides lying obliquely with respect to one another, in order to carry out the movements of the closure elements, a cost-effective and robust design is made possible. For the linear guides, use can advantageously be made of standard components as are used in large numbers in mechanical engineering and are commercially obtainable cost-effectively. The parts for fastening said linear guides can be designed relatively simply and cost effectively.

As already mentioned, the angle between the oblique adjustment and the longitudinal adjustment direction advantageously lies within the range of 5° to 20°, with a range of 6° to 12° being particularly preferred. In the case of a relatively compact design of the drive housing of the vacuum valve, a transmission ratio for the force exerted on the first or second closure element in the transverse adjustment direction by the transverse stroke drive is achieved here. The required press-on force of the closure element against the first or second valve seat in the closed state of the vacuum valve can be achieved here by a relatively small driving force of the transverse stroke drive. Force regulation or possibly travel regulation of the transverse stroke drive for the press-on force of the first or second closure element against the first or second valve seat is also facilitated by the relatively large distance between the transverse stroke carriage and the transverse stroke guide part because of the transmission ratio.

In an advantageous embodiment of the invention, the connection of the longitudinal stroke carriage to the longitudinal stroke drive has movability parallel to the transverse adjustment direction. The longitudinal stroke drive can therefore be mounted immovably with reference to the transverse adjustment direction. However, a design in which, during the movement of the closure element and of the valve rod parallel to the transverse adjustment direction, the longitudinal stroke drive moves together therewith, would also be conceivable and possible.

In an expedient embodiment, first and second longitudinal stroke linear guides and first and second transverse stroke linear guides, via which the transmission piece is in each case connected to the valve body, are arranged on both sides of the transmission piece. "On both sides" refers here to a direction lying at right angles to the longitudinal adjustment direction and at right angles to the transverse adjustment direction. There are therefore two longitudinal stroke linear guides and two transverse stroke linear guides.

It is advantageous if the oblique adjustment direction lies in the plane spanned by the longitudinal adjustment direction and transverse adjustment direction. Furthermore, it is preferred for the transverse adjustment direction to lie at right angles to the longitudinal adjustment direction, wherein the valve seat lies in a plane, with respect to which the transverse adjustment direction is oriented at right angles. As a result, a right-angled placing of the closure element onto the valve seat is made possible. However, deviations from such a right-angled placing thereon, which deviations are preferably less than 20°, are tolerable.

Within the sense of a simple embodiment, the axis of the valve opening is preferably at right angles to the plane in which the valve seat lies.

The valve rod advantageously has a longitudinal axis lying parallel to the longitudinal adjustment direction.

BRIEF DESCRIPTION OF THE DRAWINGS

Further advantages and details of the invention are explained below with reference to the attached drawing, in which.

DETAILED DESCRIPTION OF THE PREFERRED EMBODIMENT

A first exemplary embodiment of the invention is illustrated in FIGS. 1 to 34.

The vacuum valve has a valve body 1 which has opposite first and second walls, wherein the first wall has a first valve opening 2a with an axis 3a, and the second wall has a second valve opening 2b with an axis 3b. The axes 3a, 3b lie parallel to each other and preferably on a common straight line. In a first closed state of the vacuum valve, the valve opening 2a is closed by a first closure element 4a in particular of plate-like design. For this purpose, the closure element 4a is pressed onto a first valve seat 5a which surrounds the first valve opening 2a on the side facing the first closure element 4a. In a second closed state of the vacuum valve, the valve opening 2b is closed by a second closure element 4b of in particular plate-like design. For this purpose, the second closure element 4b is pressed onto a second valve seat 5b which surrounds the second valve opening 2b on the side facing the second closure element 4b.

In the open state of the vacuum valve, the first and second closure elements 4a, 4b open up the valve openings 2a, 2b, said closure elements advantageously also do not partially overlap the valve openings 2a, 2b, as seen in the direction of the axes 3a, 3b.

In order to provide a seal between the first closure element 4a and the wall having the first valve opening 2a or between the second closure element 4b and the wall having the second valve opening 2b, use is made of an elastic sealing ring 6 (for example made of FKM or FFKM) arranged on the respective closure element 4a, 4b, and the respective valve seat 5a, 5b has a sealing surface against which the sealing ring 6 is pressed. In principle, the sealing ring 6 could also be arranged on the sealing seat and pressed against a sealing surface of the respective closure element 4a, 4b.

The valve body 1 comprises a valve housing 21, in the interior space of which, which forms a vacuum region of the vacuum valve (=a region in which a vacuum can be present), the first and second closure elements 4a, 4b are arranged, and a drive housing 22.

In the exemplary embodiment, the first and second closure elements 4a, 4b are attached via a connecting part 8 to the end of a valve rod 9. The valve rod 9 is led out of the vacuum region of the vacuum valve through an opening in the valve housing 21, said valve rod being movable in the direction of its longitudinal axis 10 and also in a direction lying at right angles thereto in relation to the valve housing 21. For this purpose, use is made in the exemplary embodiment of expansion bellows 11. In principle, another type of vacuum feedthrough can be provided for this purpose, for example another type of bellows or a linear feedthrough which is itself mounted displaceably in a direction at right angles to the movement direction made possible by said linear feedthrough in a sealed manner in relation to the valve housing 21.

A transmission piece 12 is fastened rigidly to the valve rod 9 outside the vacuum region. A longitudinal stroke linear guide 13 and a transverse stroke linear guide 17, via which the transmission piece 12 is connected to the drive housing 22, are in each case arranged on both sides of the transmission piece 12.

A respective longitudinal stroke carriage 14 is guided in a linearly displaceable manner by an elongate longitudinal stroke guide part 15 of the respective longitudinal stroke linear guide 13, specifically parallel to a longitudinal adjustment direction 16. The longitudinal adjustment direction 16 lies parallel to the longitudinal axis 10 of the valve rod 9.

A respective transverse stroke carriage 18 is guided in a linearly displaceable manner by an elongate transverse stroke guide part 19 of the respective transverse stroke linear guide 17, specifically parallel to an oblique adjustment direction 20. The oblique adjustment direction 20 lies obliquely with respect to the longitudinal adjustment direction 16.

In the exemplary embodiment, the longitudinal stroke carriages 14 of the respective longitudinal stroke linear guide 13 are fastened rigidly on the opposite sides of the transmission piece 12. A transverse stroke carriage 18 of a respective transverse stroke linear guide 17 is connected rigidly to the longitudinal stroke guide part 15 of a respective longitudinal stroke linear guide 13 in the exemplary embodiment. The connection can take place, for example, as illustrated, via a holding piece 34 to which, firstly, the longitudinal stroke guide part 15 and, secondly, the transverse stroke carriage 18 are fastened. However, separate holding pieces 34 could also be dispensed with and the connection of the transverse stroke carriage 18 to the longitudinal stroke guide part 15 could also take place directly. The longitudinal stroke guide part 15 and the transverse stroke carriage 18 could also be formed integrally in each case.

In the exemplary embodiment, the transverse stroke guide parts 19 are therefore attached rigidly to the drive housing 22, specifically to side cheeks 23, 24 of the drive housing 22.

A "reversed" arrangement of the longitudinal stroke linear guides 13 and/or transverse stroke linear guides 17 (for example a rigid fastening of the longitudinal stroke guide part 15 to the transmission piece 12 and/or a rigid fastening of the transverse stroke carriage to the side cheeks 23, 24) and/or an "interchanging" of the longitudinal stroke and transverse stroke linear guides (i.e. a rigid fastening of part of the respective transverse stroke linear guide 17 to the transmission piece 12 and rigid fastening of part of the respective longitudinal stroke linear guide 13 to the drive housing) are/is likewise conceivable and possible, however, as explained more precisely further below.

In the exemplary embodiment shown, the longitudinal stroke and transverse stroke guide parts 15, 19 are designed as guide rails, i.e. in the form of profile rails. The longitudinal stroke linear guides and the transverse stroke linear guides 13, 17 are therefore rail guides. An embodiment in the form of shaft guides, in which the longitudinal stroke and transverse stroke guide parts 15, 19 are formed by cross-sectionally round bars, is also conceivable and possible. For example, a longitudinal stroke and/or transverse stroke linear guide could also be formed by means of at least one guide track in which at least one guide extension (pin or roller) engages, i.e. in the manner of a slotted guide mechanism. The guide track can be formed, for example, by a slot, a groove or a bead.

The longitudinal stroke linear guides 13 and transverse stroke linear guides 17 are advantageously designed as rolling guides. An embodiment in the form of sliding guides could also be provided.

By use of the longitudinal stroke linear guides 13 and the transverse stroke linear guides 17, the transmission piece 12 can be adjusted from an open position, in which the vacuum valve takes up the open state, via an intermediate position into a first or second closing position, in which the vacuum valve takes up the first or second closed state, and back, as is explained in more detail further below. The adjustment between the open position and the intermediate position takes place here parallel to the longitudinal adjustment direction 16. The adjustment between the intermediate position and the closing position takes place parallel to a transverse adjustment direction 30 which lies at an angle, preferably at right angles, to the longitudinal adjustment direction 16.

The transverse adjustment direction 30 preferably lies parallel to the axis 3 of the valve opening 2.

For the displacement of the longitudinal stroke carriage 14 along the longitudinal stroke guide parts 15, use is made of a longitudinal stroke drive 25. In the exemplary embodiment, the latter is formed by a pneumatic piston-cylinder unit, the piston rod 26 of which lies parallel to the longitudinal adjustment direction 16 and is connected to the transmission piece 12. The connection takes place here via a connecting piece 27. The piston rod 26 of the longitudinal stroke drive 25 is fixed to the connecting piece 27. The connecting piece 27 is connected non-displaceably in relation to the transmission piece 12, with reference to the longitudinal adjustment direction 16, but is displaceable with reference to the transverse adjustment direction 30. For this purpose, connecting bolts 28 are provided which are held in the region of their two ends on the transmission piece 12 and traverse a recess of the transmission piece 12. The connecting bolts 28 pass through passage openings 29 in the connecting piece 27, and therefore the connecting piece 27 is guided displaceably in relation to the connecting bolt 28.

In the exemplary embodiment, the valve rod 9 passes through the connecting piece 27 with play (and therefore the adjustment of the transmission piece 12 between the intermediate position and the first and second closing position and the associated movement of the valve rod 9 are made possible). For example, the longitudinal stroke drive could also comprise two piston-cylinder units which are arranged on both sides of the valve rod 9.

A connection, which is non-displaceable in the longitudinal adjustment direction 16, but is displaceable in the transverse adjustment direction 30, between the longitudinal stroke drive 25 and the longitudinal stroke carriage 14 could also be realized in a different form.

Furthermore, a connection, which is non-displaceable both in the direction of the longitudinal adjustment direction 16 and in the direction of the transverse adjustment direction 30, between the longitudinal stroke drive 25 and the longitudinal stroke carriage 14 could also be provided. During the displacement of the transmission piece 12 in the transverse adjustment direction 30, the longitudinal stroke drive 25 (together with corresponding holding parts) would then be displaced together with said transmission piece.

For the formation of the longitudinal stroke drive 25, a piston 40 is arranged in a cylinder recess 41 which, in the exemplary embodiment, is arranged in a cylinder block 35. On the one side, the cylinder recess 41 is closed by a cover 50 and the piston rod 26 runs through an opening in the cover 50, and, on the other side, the cylinder recess is closed by a cover 42.

For the displacement of the transverse stroke carriage 18 along the transverse stroke guide parts 19, use is made of a transverse stroke drive 31. In the exemplary embodiment, the latter is formed by pneumatic piston-cylinder units. The piston rods 32 of said piston-cylinder units lie parallel to the oblique adjustment direction 20 and are connected to the respectively assigned transverse stroke carriage 18. In the exemplary embodiment, the piston rods 32 are each fastened for this purpose to a connection plate 33 which is fastened to the holding piece 34 of the respective longitudinal stroke guide part 15. Other connections of the piston rods 32 to the transverse stroke carriages 18 are also conceivable and possible. The connection is immovable at least with reference to the direction—the oblique adjustment direction 20.

In the exemplary embodiment, the transverse stroke drive comprises two piston-cylinder units which each comprise a main piston 43 and an auxiliary piston 44. The main and auxiliary pistons 43, 44 are arranged in a cylinder recess 46 in the cylinder block 35, wherein cylinder spaces separated by a stationary separating disk 47 are formed. An auxiliary piston rod 45 which passes through a recess in the separating disk 47 is attached to the auxiliary piston 44. The piston rod 32 which is led out of the cylinder recess 46 through an opening in the cylinder block 35 is attached to the main piston 43. At the other end, the cylinder recess 41 is closed by a cover 48.

The piston surfaces of the auxiliary pistons 44 are greater than those of the main pistons 43. Instead (or additionally thereto), the auxiliary pistons 44 could also be subjected to a higher pressure than the main pistons 43.

Instead of the cylinder block 35, separate cylinders could also be provided for the piston-cylinder unit of the longitudinal stroke drive 25 and for the respective piston-cylinder unit of the transverse stroke drive 31.

The longitudinal stroke drive 25 could also have more than one piston-cylinder unit. The transverse stroke drive could also have only one piston-cylinder unit (wherein a rigid connection could be provided between the two holding pieces 34), or could also have more than two piston-cylinder units.

In order to close the vacuum valve from its open state, the transmission piece 12 is first of all displaced linearly from its open position (FIG. 1, FIG. 5, FIG. 9, FIG. 13, FIGS. 18 to 20, FIG. 30) into its intermediate position (FIG. 2, FIG. 6, FIG. 10, FIG. 14, FIGS. 21 to 23, FIG. 31) in the longitudinal adjustment direction 16 by the longitudinal stroke drive 25, wherein the valve rod 9 and the closure elements 4a, 4b are carried along, i.e. are likewise displaced linearly in the longitudinal adjustment direction 16. For this purpose, in the exemplary embodiment, the longitudinal stroke carriage 14 is displaced along the longitudinal stroke guide parts 15 by the longitudinal stroke drive 25.

In the open position of the transmission piece 12, the respective longitudinal stroke carriage 14 has a first position relative to the respective longitudinal stroke guide part 15. In the intermediate position of the transmission piece 12, the respective longitudinal stroke carriage 14 has a second position relative to the respective longitudinal stroke guide part 15. The first and second positions of the respective longitudinal stroke carriage 14 can be secured, for example, by the respective end of the longitudinal stroke drive 25.

During the displacement of the transmission piece 12 from the open position into the intermediate position, positions of the transverse stroke carriage 18 in relation to the transverse stroke guide parts 19 do not change. The transverse stroke carriages 18 take up a central position relative to the transverse stroke guide parts 19.

After the transmission piece 12 has reached the intermediate position, the vacuum valve can be brought into its first or second closed state. In order to take up the first closed state, the transmission piece 12 is linearly displaced in the transverse adjustment direction 30 by the transverse stroke drive 31. The valve rod 9 and the closure elements 4a, 4b are carried along here, i.e. are likewise displaced linearly in the transverse adjustment direction 30. For the displacement of the transmission piece 12 in the transverse adjustment direction 30, in the exemplary embodiment, the transverse stroke carriages 18 are displaced along the transverse stroke guide parts 19 in the oblique adjustment direction 20 by the transverse stroke drive 31 from the central position which the respective transverse stroke carriage 18 takes up in relation to the respectively assigned transverse stroke guide part 19 into a first press-on position which the respective transverse stroke carriage 18 takes up relative to the respectively assigned transverse stroke guide part 19. This displacement of the respective transverse stroke carriage 18 takes place via the respective main piston 43. During the displacement of the transverse stroke carriages 18, the longitudinal stroke guide parts 15 to which the transverse stroke carriages 18 are attached are displaced at the same time. The relative position of the longitudinal stroke carriages 14 to the longitudinal stroke guide parts 15 changes as a result, specifically a displacement of the respective longitudinal stroke carriage 14 relative to the longitudinal stroke guide part 15 takes place in the direction of the abovementioned first position of the longitudinal stroke carriage 14. The position of the longitudinal stroke carriage 14 relative to the longitudinal adjustment direction 16 (=relative to the valve body 1) does not change in this case, but a linear displacement (=parallel displacement) of the longitudinal stroke carriages 14 and therefore of the transmission piece 12 takes place in the transverse adjustment direction 30, and therefore a linear displacement of the valve rod 9 and of the closure elements 4a, 4b takes place in the transverse adjustment direction 30. The transmission piece 12 is therefore displaced from the intermediate position into the first closing position, in which the closure element 4a is pressed onto the valve seat 5a and the valve opening 2a is closed. The first closing position of the transmission piece 12 is illustrated in FIGS. 3, 7, 11, 15, 24 to 26 and 32.

The adjustment of the transmission piece 12 from the first closing position back into the intermediate position takes place by a displacement of the transverse stroke carriages 18 counter to the oblique adjustment direction 20 from the first press-on position relative to the respectively assigned transverse stroke guide part 19 into its central position by the main pistons 43. In the central positions of the transverse stroke carriages 18, the main pistons 43 run up against the auxiliary piston rods 45, wherein the auxiliary piston rods 45 limit the movement of the main pistons 43 counter to the transverse adjustment direction 30. The auxiliary pistons 44 are displaced here maximally in the direction of the main pistons 43.

In order, starting from the intermediate position of the transmission piece 12, to take up the second closed state of the vacuum valve, in which the second closure element 4b closes the second valve opening 2b, the transmission piece 12 is displaced linearly counter to the transverse adjustment direction 30 by the transverse stroke drive 31. For this purpose, the transverse stroke carriages 18 are displaced along the transverse stroke guide parts 19 counter to the oblique adjustment direction 20 by the transverse stroke drive 31 from the central position, which the respective transverse stroke carriage 18 takes up relative to the respectively assigned transverse stroke guide part 19, into a second press-on position which the respective transverse stroke carriage 18 takes up relative to the respectively assigned transverse stroke guide part 19. During the displacement of the transverse stroke carriages 18, the longitudinal stroke guide parts 15 are in turn displaced at the same time, as a result of which the relative position of the longitudinal stroke carriages 14 to the longitudinal stroke guide parts 15 changes, specifically a displacement of the respective longitudinal stroke carriage relative to the longitudinal stroke guide part takes place in a direction directed away from the aforementioned first position of the longitudinal stroke carriage 14. The position of the longitudinal stroke carriages 14 relative to the longitudinal adjustment direction 16, i.e. relative to the valve body 1, does not change here, but a linear displacement of the longitudinal stroke carriages 14 counter to the transverse adjustment direction 30 and, in association therewith, a linear displacement of the transmission piece 12 counter to the transverse adjustment direction 30 into its second closing position take place. The valve rod 9 and the closure element 4b are therefore displaced linearly counter to the transverse adjustment direction 30, and the closure element 4b is pressed onto the second valve seat 5b. The second closing position of the transmission piece 12 is illustrated in FIGS. 4, 8, 12, 16, 27 to 29 and 33.

The displacement of the transverse stroke carriages 18 from the central position, which the respective transverse stroke carriage 18 takes up relative to the respectively assigned transverse stroke guide part 19, into the second press-on position takes place by means of the main pistons 43. The cylinder spaces of the auxiliary pistons 44 are vented here on both sides of the auxiliary piston 44, and therefore the auxiliary piston rod 45 can be displaced from the main piston 43 counter to the oblique adjustment direction 20.

The adjustment of the transmission piece 12 from the second closing position back into the intermediate position takes place by the auxiliary pistons 44. The latter are displaced by corresponding pressurization in the direction of the main pistons 43, wherein the auxiliary piston rods 45 displace the main pistons 43 in the oblique adjustment direction 20. A displacement of the transverse stroke carriages 18 in the oblique adjustment direction 20 therefore takes place until the transverse stroke carriages 18 take up their central positions relative to the transverse stroke guide parts 19.

In order to completely open the vacuum valve from the intermediate position of the transmission piece 12, the longitudinal stroke carriages 14 are displaced counter to the longitudinal adjustment direction 16 by the longitudinal stroke drive 25 until they take up their first positions in relation to the longitudinal stroke guide parts 15. The positions of the transverse stroke carriages 18 in relation to the transverse stroke guide parts 19 do not change here.

The valve rod 9 advantageously extends beyond the transmission piece 12 counter to the longitudinal adjustment direction 16. In this portion of its longitudinal extent, preferably in the region of its end remote from the closure elements 4a, 4b, the valve rod 9 is supported in the first closing position of the transmission piece 12 against a first stop 38a mounted on the valve body, and in the second closing position of the transmission piece 12 against a second stop 38b mounted on the valve body. The first stop 38a lies on the same side of the valve rod 9 as the valve seat 5a, with reference to the transverse adjustment direction 30. The second stop 38b lies on the same side of the valve rod as the valve seat 5b, with reference to the transverse adjustment direction 30. By this support of the valve rod 9 in the first and second closed state of the vacuum valve, the moments acting on the liner guides 13, 17 are reduced, and preferably at least substantially eliminated (if the transmission piece 12 is located in the central region of the valve rod 9, as is preferred). The stops 38a, 38b are advantageously of elastic design, preferably with an elasticity similar to the sealing rings 6.

The angle 37 which the oblique adjustment direction 20 encloses with the longitudinal adjustment direction 16 is advantageously smaller than 45° and greater than 4°, wherein an angle 37 within the range of 5° to 20° is preferred. For example, the angle 37 can be approximately 7.5°.

The transverse adjustment direction 30 lies in the plane spanned by the longitudinal adjustment direction 16 and transverse adjustment direction 30. In other words, the oblique adjustment direction is rotated by the angle 37 in relation to the longitudinal adjustment direction 16 about an axis lying at right angles to the longitudinal adjustment direction 16 and at right angles to the transverse adjustment direction 30.

In order to achieve the correct sequence of the actuations by the longitudinal stroke drive 25 and transverse stroke drive 31, a mechanical sequence control can be provided. Such sequence controls are known, for example, from the prior art mentioned at the beginning corresponding to U.S. Pat. No. 8,177,190 B2, and do not have to be explained further at this juncture. An electric sequence control which actuates corresponding valves for pressurizing the drives in the correct order and at the correct times can also be provided. For the detection of the state of the valve at a particular instant, corresponding position indicators can be provided.

Instead of pneumatic drives for the longitudinal stroke drive and/or transverse stroke drive, drives operated by other operating means can be used, for example electrically operated drives, for example electric motors, linear drives, etc. Such electrically operated drives can be designed, for example, in the form of rack drives, spindle drives, etc.

A drive unit 36 which is equipped with the respective longitudinal stroke and transverse stroke drives and is connected to the remaining part of the vacuum valve can be provided. The remaining part of the vacuum valve can be designed identically here for different types of drives. There is therefore a "separating plane" between the drive unit 36 and the remaining part of the vacuum valve. A modular construction is therefore provided. Depending on the desired manner of driving, a suitable module of a drive unit 36 can be connected to the linear guides. A retrospective exchange of the drive unit 36 is also possible, wherein the drive unit 36 is removed as a whole and replaced by a desired other drive unit 36.

Servicing of the vacuum valve in the event of a defect in the drive unit is thereby also substantially simplified.

In the exemplary embodiment, the drive unit 36 is formed by the cylinder block 35 with the parts arranged therein. The drive housing 22 is formed in the exemplary embodiment by the cylinder block 35, the side cheeks 23, 24 and the covering plates 39, only illustrated in FIG. 34.

In order to permit servicing of the vacuum valve, the valve housing 21 has a removable cover 49.

Figure 1:
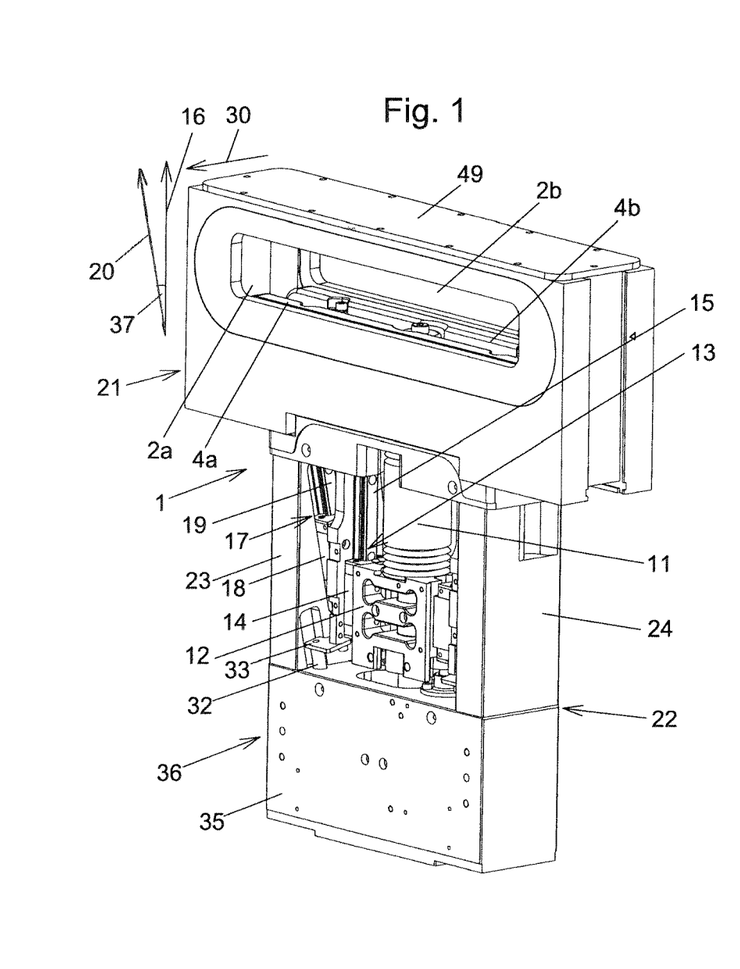
FIG. 1 shows a perspective view of a vacuum valve according to an exemplary embodiment of the invention in the open state of the vacuum valve.
Figure 2:
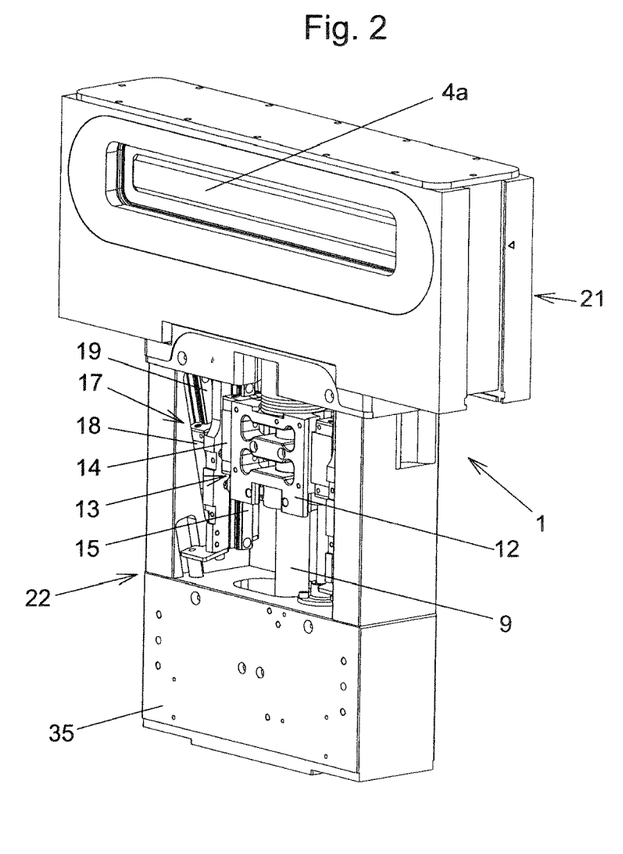
FIG. 2 shows the vacuum valve from FIG. 1 in the intermediate position of the transmission piece.
Figure 3:
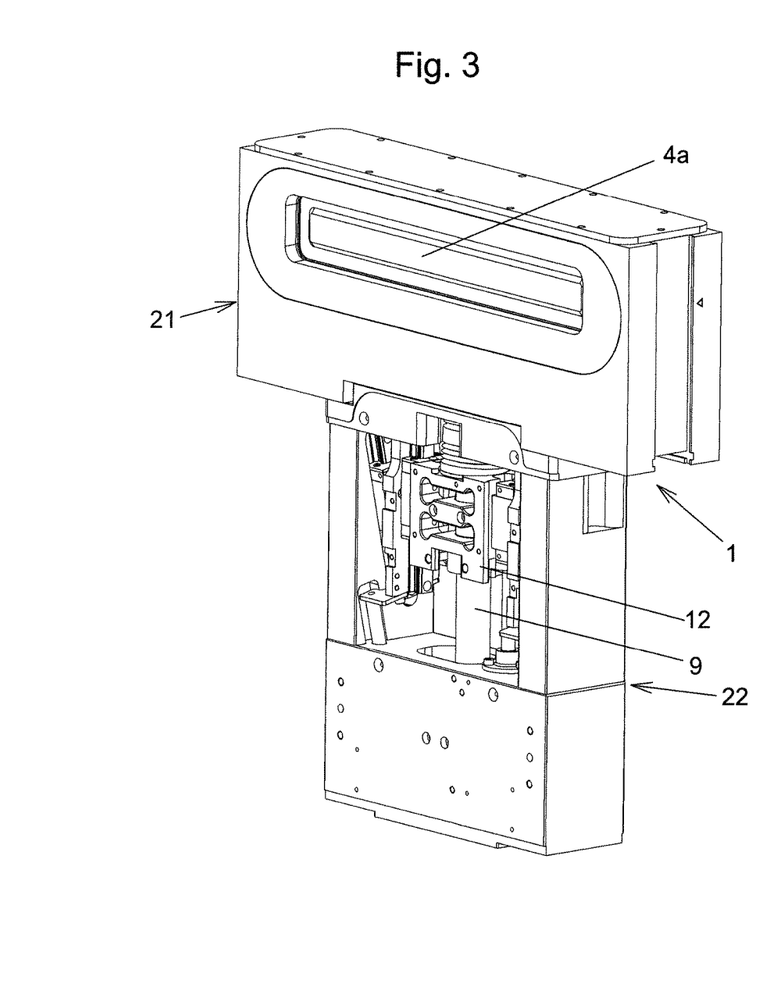
FIGS. 3 and 4 show the vacuum valve from FIG. 1 in the first and second closing position of the transmission piece (=first and second closed state of the vacuum valve)
Figure 4:
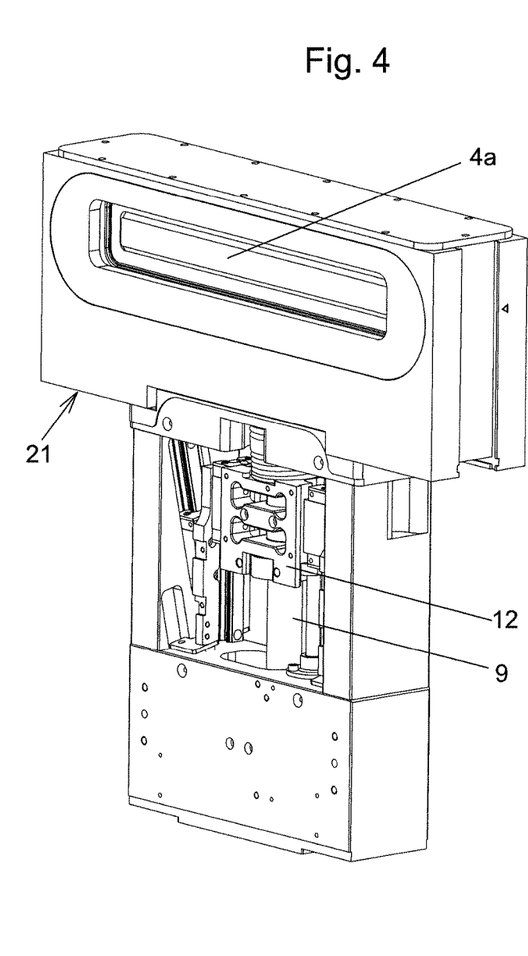
Figure 5:
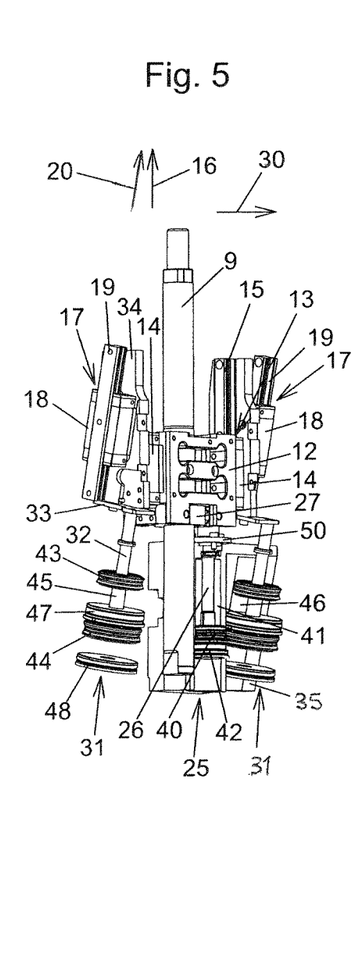
FIGS. 5 to 8 show illustrations analogously to FIGS. 1 to 4 from a changed viewing direction, wherein, however, parts of the vacuum valve are omitted (in particular the valve housing and the closure elements) and a half section of the cylinder block is illustrated.
Figure 6:
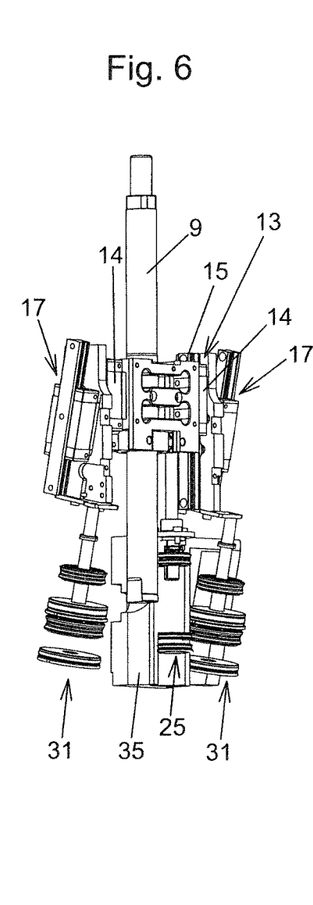
Figure 7:
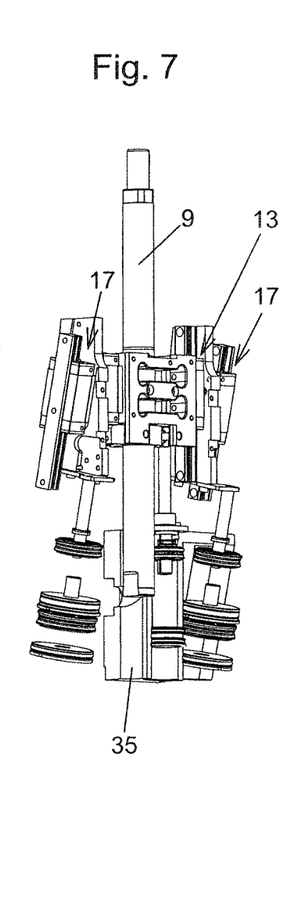
Figure 8:
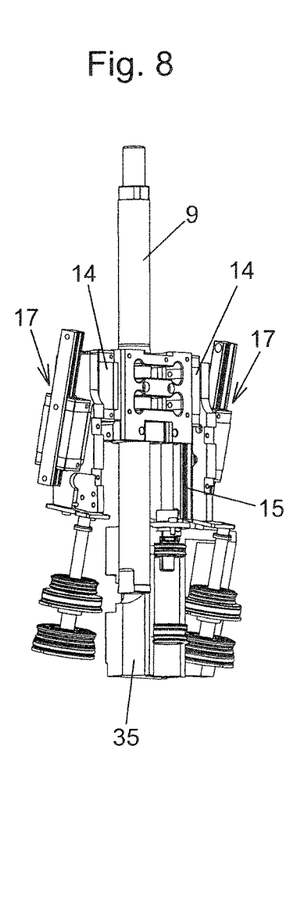
Figure 9:
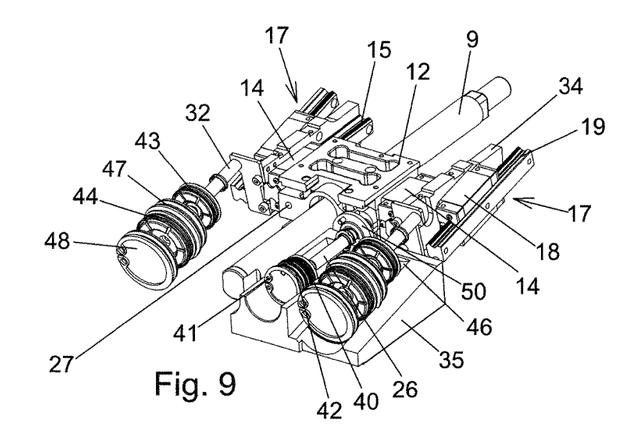
FIGS. 9 to 12 show illustrations corresponding to FIGS. 5 to 8 from a changed viewing direction.
Figure 10:
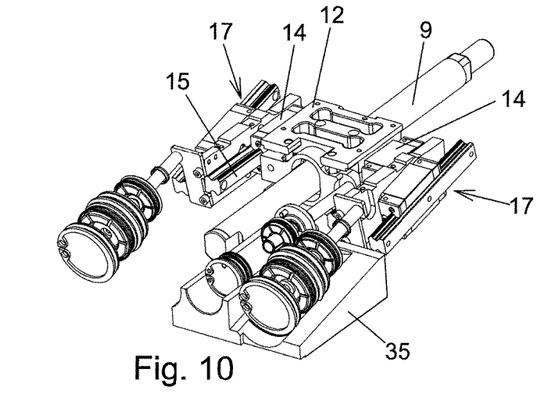
Figure 11:
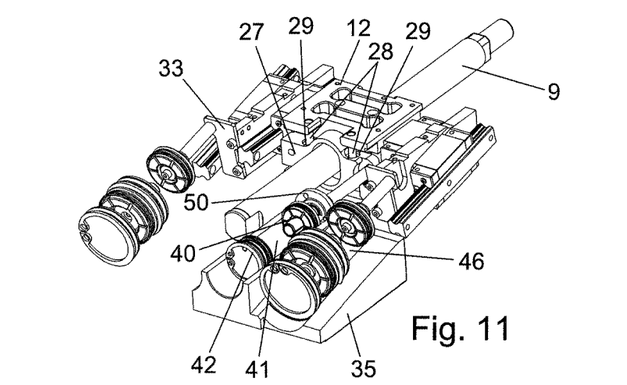
Figure 12:
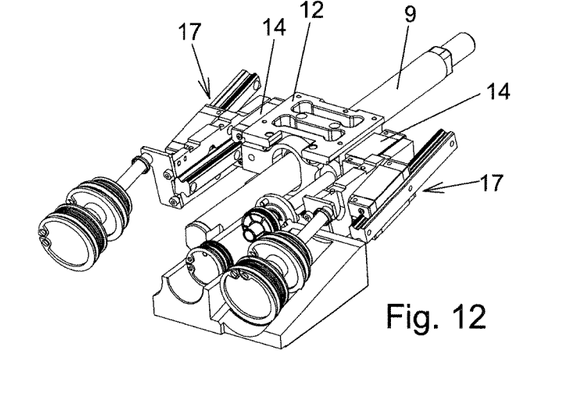
Figure 13:
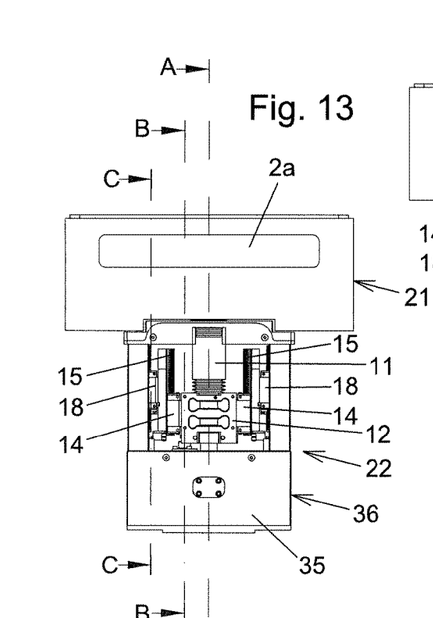
FIGS. 13 to 16 show views of the vacuum valve in the states according to FIGS. 1 to 4.
Figure 14:
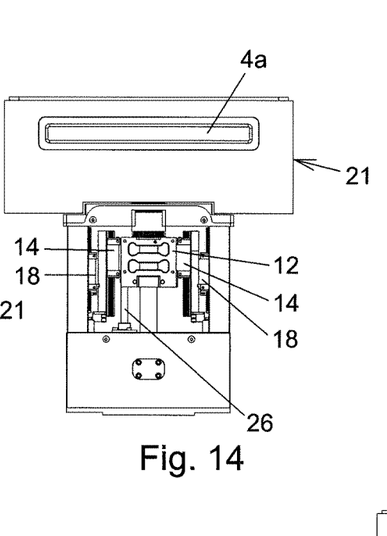
Figure 15:
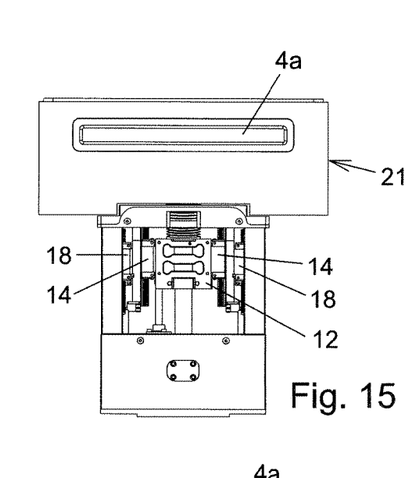
Figure 16:
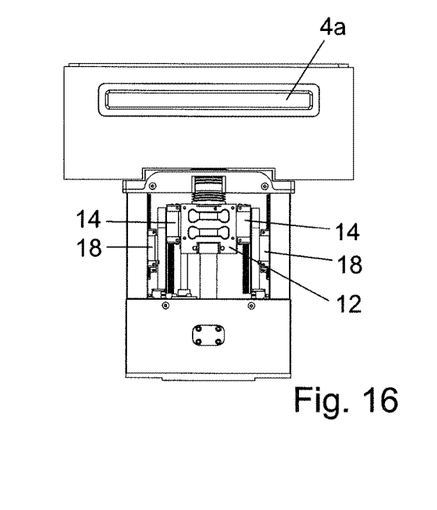
Figure 17:
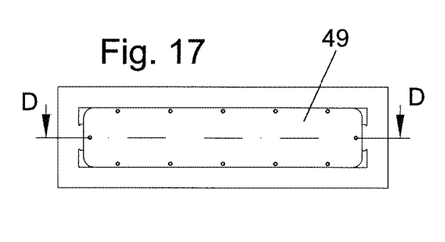
FIG. 17 shows a top view of the vacuum valve.
Figure 18:
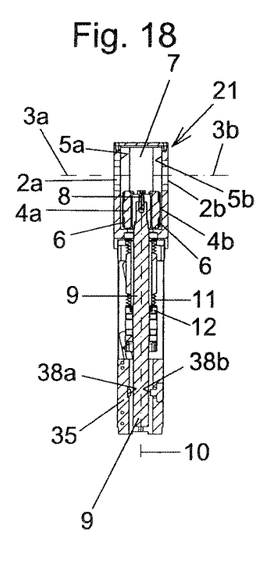
FIG. 18 shows a section along the line A-A from FIG. 13.
Figure 19:
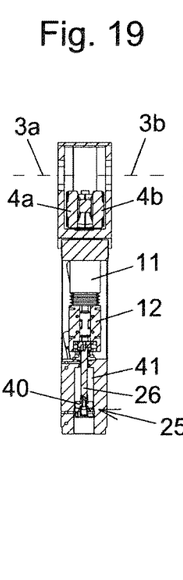
FIG. 19 shows a section along the line B-B from FIG. 13.
Figures 20, 21:
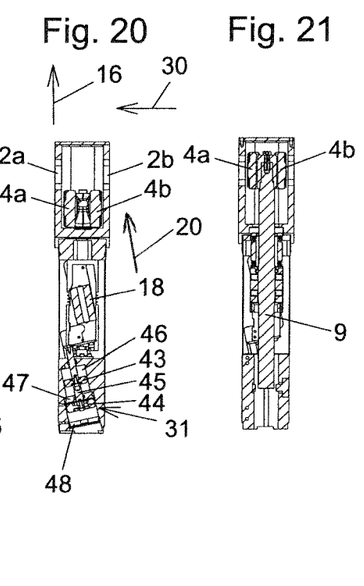
FIG. 20 shows a section along the line C-C from FIG. 13.
FIGS. 21 to 23 show sections analogously to FIGS. 18 to 20, but in the intermediate position of the transmission piece.
Figure 22:
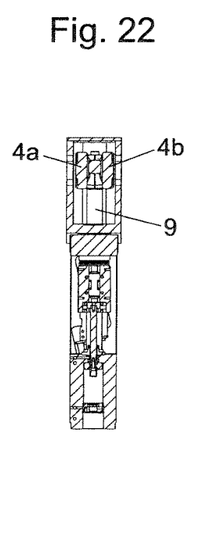
Figure 23:
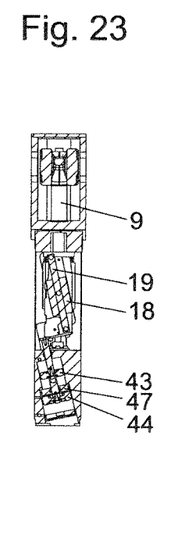
Figure 24:
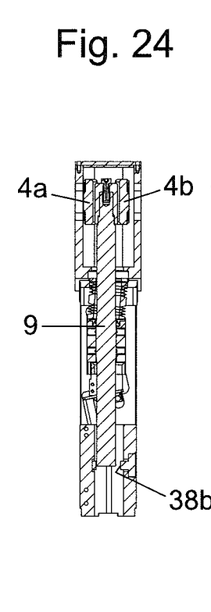
FIGS. 24 to 26 show sections analogously to FIGS. 18 to 20, but in the first closing position of the transmission piece.
Figure 25:
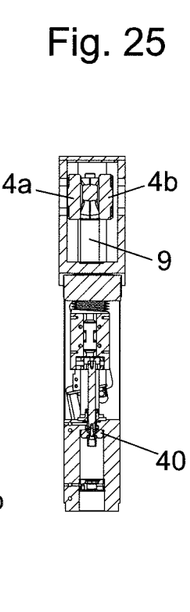
Figure 26:
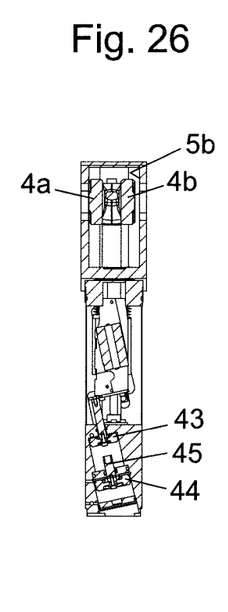
Figure 27:
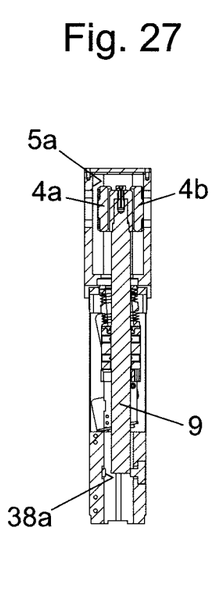
FIGS. 27 to 29 show sections analogously to FIGS. 18 to 20, but in the second closing position of the transmission piece.
Figure 28:
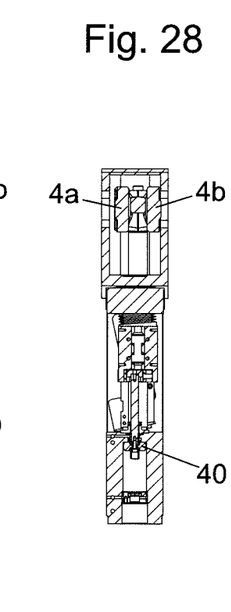
Figure 29:
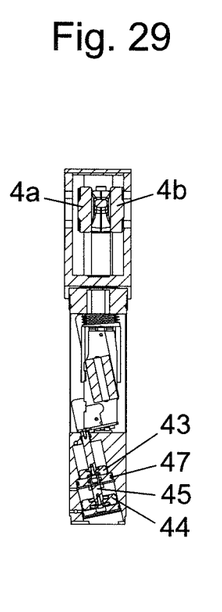
Figure 30:
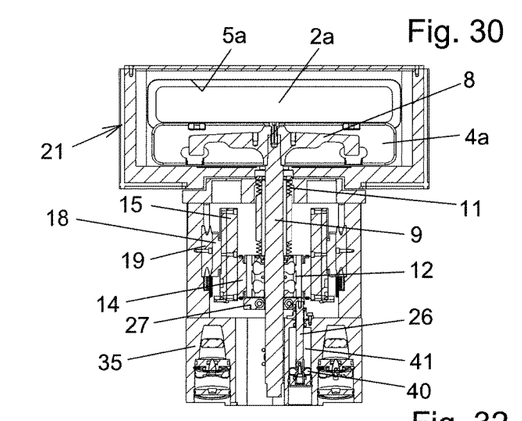
FIG. 30 shows a section along the line D-D from FIG. 17.
Figure 31:
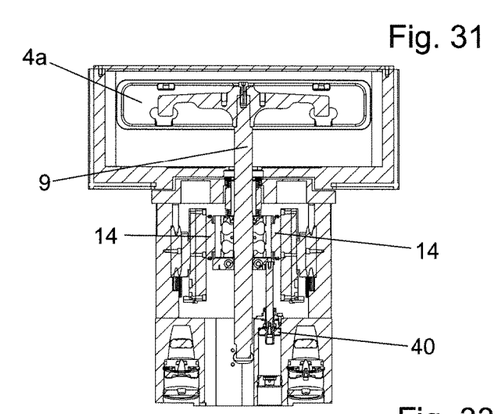
FIGS. 31, 32 and 33 show sections analogously to FIG. 30 in the intermediate position, first closing position and second closing position of the transmission piece, wherein, however, the intersecting line is slightly displaced in comparison to FIG. 30 and always runs through the center of the piston rod.
Figure 32:
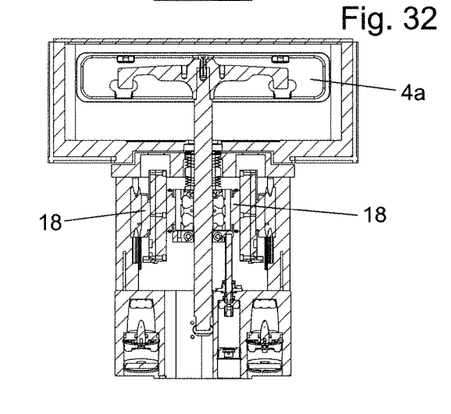
Figure 33:
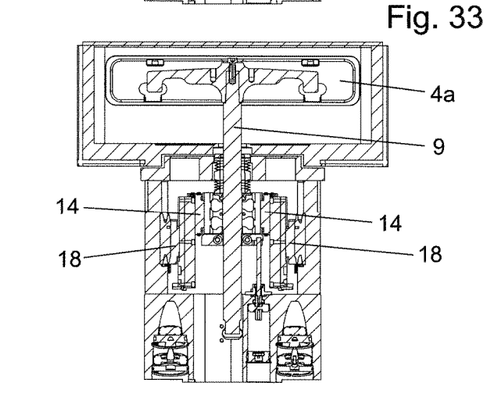
Figure 34:
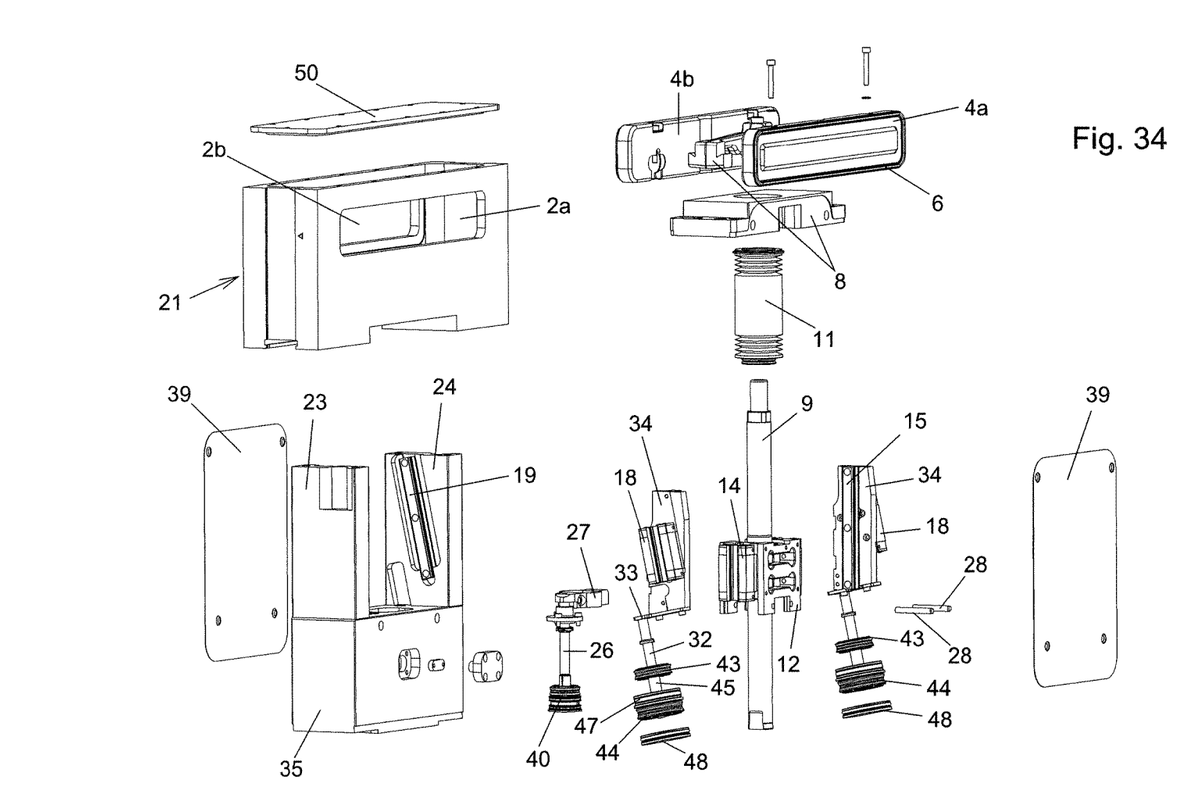
FIG. 34 shows an exploded illustration, wherein parts of the guides and drives that move together are illustrated in the interconnected state.
Figure 35:
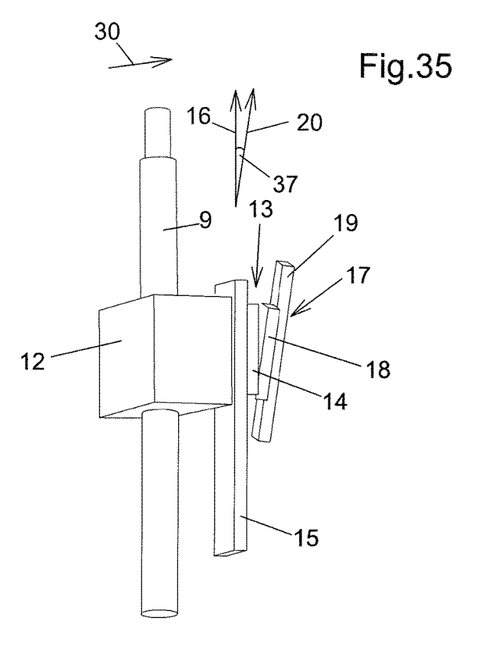
FIG. 35 shows a simplified, schematized illustration analogously to FIG. 5 for a second exemplary embodiment of the invention, wherein further parts are omitted in comparison to FIG. 5 (also the longitudinal stroke and transverse stroke linear guides are illustrated only on one side of the transmission piece)

The second exemplary embodiment which is illustrated schematically in FIG. 35 differs from the previously described first exemplary embodiment only by the "reversal" of the longitudinal stroke linear guides 13. The longitudinal stroke guide parts 15 are therefore fastened to the transmission piece 12 on both sides, and the longitudinal stroke carriages 14 are rigidly connected to the transverse stroke carriages 18 (directly or via a holding piece analogously to the holding piece 34). Only the linear guides arranged on one side of the holding piece are illustrated in FIG. 35.

The transverse stroke linear guide 17 could likewise be arranged in a reversed manner such that the transverse stroke guide parts 19 would then be connected rigidly to the longitudinal stroke carriages 14. In a further possible variant embodiment, only the transverse stroke linear guides 17 could be arranged in a reversed manner, but the longitudinal stroke linear guides 13 in the manner as illustrated in the first exemplary embodiment. The longitudinal stroke guide parts 15 would then be connected rigidly to the transverse stroke guide parts 19.

Figure 36:
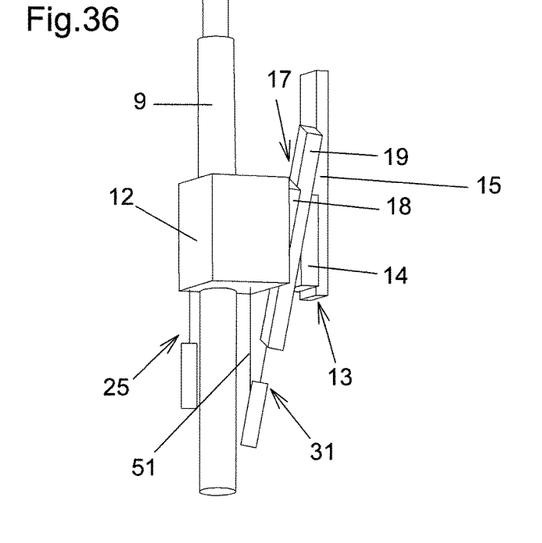
FIG. 36 shows an illustration analogously to FIG. 35 for a third exemplary embodiment of the invention.

The third exemplary embodiment, which is illustrated in FIG. 36, differs from the previously described first exemplary embodiment only in that the longitudinal stroke linear guides 13 and the transverse stroke linear guides 17 are "interchanged". The transverse stroke carriages 18 are therefore attached rigidly on both sides to the transmission piece 12 and the transverse stroke guide parts 19 are connected rigidly to the longitudinal stroke carriages 14. The longitudinal stroke guide parts 15 are attached in a manner mounted on the valve body.

The connection of the longitudinal stroke drive 25 (which is only indicated schematically) to the transmission piece 12 can take place in an analogous manner to the first exemplary embodiment. During an adjustment of the transmission piece 12 in the longitudinal adjustment direction 16, the transverse stroke drive 31 moves together with the transmission piece 12. For this purpose, a fastening part 51 between the transmission piece 12 and the cylinder of the transverse stroke drive 31 (only indicated schematically) is indicated schematically in FIG. 36.

The linear guides are in turn illustrated schematically only on one side of the transmission piece in FIG. 36.

Also in the exemplary embodiment according to FIG. 36, the longitudinal stroke linear guides 13 and/or the transverse stroke linear guides 17 could be arranged in a reversed manner.

Different modifications of the exemplary embodiments shown are conceivable and possible without departing from the region of the invention. The closure element could thus be attached, for example, to two or more parallel valve rods. The use of only one longitudinal stroke linear guide and/or only one transverse stroke linear guide or the use of more than two longitudinal stroke linear guides and/or transverse stroke linear guides would also be conceivable and possible.

The transmission piece 12 could also be formed integrally with those parts of the longitudinal stroke or transverse stroke linear guide that are rigidly connected thereto.

KEY TO THE REFERENCE NUMBERS

1 Valve body
2a First valve opening
2b Second valve opening
3a First axis
3b Second axis
4a First closure element
4b Second closure element
5a First valve seat
5b Second valve seat
6 Sealing ring
7 Interior space
8 Connecting part
9 Valve rod
10 Longitudinal axis
11 Expansion bellows
12 Transmission piece
13 Longitudinal stroke linear guide
14 Longitudinal stroke carriage
15 Longitudinal stroke guide part
16 Longitudinal adjustment direction
17 Transverse stroke linear guide
18 Transverse stroke carriage
19 Transverse stroke guide part
20 Oblique adjustment direction
21 Valve housing
22 Drive housing
23 Side cheek
24 Side cheek
25 Longitudinal stroke drive
26 Piston rod
27 Connecting piece
28 Connecting bolt
29 Passage opening
30 Transverse adjustment direction
31 Transverse stroke drive
32 Piston rod
33 Connection plate
34 Holding piece
35 Cylinder block
36 Drive unit
37 Angle
38a First stop
38b Second stop
39 Covering plate
40 Piston
41 Cylinder recess
42 Cover
43 Main piston
44 Auxiliary piston
45 Auxiliary piston rod
46 Cylinder recess
47 Separating disk
48 Cover
49 Cover
50 Cover
51 Fastening part

The invention claimed is:
1. A vacuum valve, comprising:
a valve body with a first valve opening which has a first axis and is surrounded by a first valve seat, and with a second valve opening which has a second axis and is surrounded by a second valve seat, a first closure element and a second closure element attached to a valve rod, a transmission piece attached to the valve rod that is adjustable in a longitudinal adjustment direction from an open position, in which the first and the second closure elements open up the first and second valve openings, into an intermediate position, in which the first and the second closure elements overlap the first and second valve openings, but are raised from the first and second valve seats, and which is adjustable in a transverse adjustment direction from the intermediate position into a first closing position, in which the first closure element lies against the first valve seat, and counter to the transverse adjustment direction from the intermediate position into a second closing position, in which the second closure element lies against the second valve seat, a longitudinal stroke drive by which the transmission piece is adjustable from the open position into the intermediate position, a longitudinal stroke linear guide having a longitudinal stroke guide part extending parallel to the longitudinal adjustment direction and a longitudinal stroke carriage guided displaceably by the longitudinal stroke guide part, wherein, for adjustment of the transmission piece from the open position into the intermediate position, the longitudinal stroke carriage is displaceable linearly in relation to the longitudinal stroke guide part, or the longitudinal stroke guide part is displaceable linearly in relation to the longitudinal stroke carriage, in the longitudinal adjustment direction by the longitudinal stroke drive, a transverse stroke drive by which the transmission piece is adjustable from the intermediate position into the first closing position or into the second closing position, a transverse stroke linear guide which comprises a transverse stroke guide part which extends parallel to an oblique adjustment direction which extends obliquely with respect to the longitudinal adjustment direction, and a transverse stroke carriage which is guided displaceably by the transverse stroke guide part, the transmission piece is connected via the longitudinal stroke linear guide and the transverse stroke linear guide to the valve body, and, for adjustment of the transmission piece from the intermediate position into the first closing position, the transverse stroke carriage is linearly displaceable in relation to the transverse stroke guide part, or the transverse stroke guide part is linearly displaceable in relation to the transverse stroke carriage, in the oblique adjustment direction by the transverse stroke drive from a central position into a first press-on position, and, for the adjustment of the transmission piece from the intermediate position into the second closing position, the transverse stroke carriage is linearly displaceable in relation to the transverse stroke guide part, or the transverse stroke guide part is linearly displaceable in relation to the transverse stroke carriage, counter to the oblique adjustment direction by the transverse stroke drive from the central position into a second press-on position, wherein the central position lies between the first press-on position and the second press-on position, and during the adjustment of the transmission piece from the intermediate position into the first closing position and during the adjustment of the transmission piece from the intermediate position into the second closing position, a relative displacement between the longitudinal stroke guide part and the longitudinal stroke carriage occurs.

2. The vacuum valve as claimed in claim 1, wherein the oblique adjustment direction is inclined by an angle of less than 45° in relation to the longitudinal adjustment direction.

3. The vacuum valve as claimed in claim 2, wherein the oblique adjustment direction is inclined by an angle of more than 4° in relation to the longitudinal adjustment direction.

4. The vacuum valve as claimed in claim 3, wherein the oblique adjustment direction encloses an angle which lies within a range of 5° to 20° with the longitudinal adjustment direction.

5. The vacuum valve as claimed in claim 1, wherein the oblique adjustment direction lies in a plane spanned by the longitudinal adjustment direction and the transverse adjustment direction.

6. The vacuum valve as claimed in claim 1, wherein the transverse adjustment direction is at right angles to the longitudinal adjustment direction.

7. The vacuum valve as claimed in claim 1, wherein the transverse adjustment direction lies parallel to one of the first axis and the second axis.

8. The vacuum valve as claimed in claim 1, wherein the valve rod has a longitudinal axis that extends parallel to the longitudinal adjustment direction.

9. The vacuum valve as claimed in claim 1, wherein a connection of the transmission piece to the longitudinal stroke drive has movability parallel to the transverse adjustment direction.

10. The vacuum valve as claimed in claim 9, further comprising a connecting piece on which the longitudinal stroke drive acts, and the connecting piece is guided displaceably parallel to the transverse adjustment direction by the transmission piece.

11. The vacuum valve as claimed in claim 1, wherein the longitudinal stroke linear guide comprises first and second longitudinal stroke linear guides and the transverse stroke linear guide comprises first and second transverse stroke linear guides, and the first and second longitudinal stroke linear guides and the first and second transverse stroke linear guides connect the transmission piece to the valve body and are arranged on opposite sides of the transmission piece.

12. The vacuum valve as claimed in claim 1, wherein a drive unit which includes the longitudinal stroke drive and the transverse stroke drive is removable as a whole from a remaining part of the vacuum valve.

* * * * *